UNITED STATES PATENT OFFICE 2,564,696

HYDROCARBON SYNTHESIS

Percival C. Keith, Peapack, and Earl W. Riblett, Tenafly, N. J., assignors to Hydrocarbon Research, Inc., New York, N. Y., a corporation of New Jersey No Drawing. Application December 3, 1946, Serial No. 713,838

9 Claims. (Cl. 260—449.6)

The present invention relates to the catalytic reaction between carbon oxide and hydrogen and is more particularly concerned with overcoming loss of catalytic activity throughout an extended period of operation.

The invention involves conversion of carbon monoxide and hydrogen into a product of predetermined composition containing compounds of higher molecular weight than carbon monoxide by contact with a synthesis catalyst containing a relatively minor proportion of alkali metal in an effective form such that the catalyst is operative to produce the desired product. Carbon monoxide and hydrogen are passed in contact with the catalyst in a reaction zone maintained under conversion conditions, including an elevated temperature, such that substantial conversion into the desired product occurs, the conversion being accompanied by disappearance in small amount of effective alkali metal from the catalyst, which disappearance, unless compensated for, results in decline of or change in catalyst activity. In accordance with this invention, alkali metal is introduced or added to the catalyst so as to compensate for the aforesaid disappearance. Reference to alkali metal in the catalyst means alkali metal content whether present in the form of a salt or an oxide or in the elemental state or in any other condition occurring in operation.

It is contemplated that the alkali metal may be added either continuously or intermittently in the course of operation of the process without substantial change in operating temperature. Substantially continuous introduction of the alkali metal is advantageous from the standpoint of maintaining the catalyst activity at a substantially constant and uniform level.

An effective synthesis catalyst comprises a metal of the iron group or ruthenium, and usually contains promoting agents such as the oxides of thorium, magnesium, etc. A small amount of alkali metal or alkali metal compound is an essential modifying component of the synthesis catalyst. Such modifying agent is important in hydrocarbon synthesis for the production of predominantly liquid hydrocarbons in the motor gasoline boiling range.

In this process, it is advisable to maintain the reaction temperature within predetermined narrow limits, say 600° to 650° F. for an iron catalyst, in order to obtain optimum results with respect either to product composition or product yield, or both. In hydrocarbon synthesis, at higher temperatures, under given conditions of charge, space velocity, pressure, and the like, the yield of liquid hydrocarbons will decrease and there will be a corresponding increase in gaseous conversion products. On the other hand, at lower temperatures the percentage conversion to liquid hydrocarbons is also materially reduced.

In the case of typical iron catalysts, of predetermined alkali metal content, the production of gasoline hydrocarbons generally proceeds under optimum conditions at about 600° to 650° F. at a pressure of about 200 to 250 lbs. per square inch gauge. Over a long period of operation there is usually a progressive decrease in catalyst activity with a change in product yield and distribution involving decreased production of gasoline hydrocarbons and frequently an increased production of gaseous products. The decrease in activity referred to is not the type which may be overcome by the usual steps of regeneration or revivification involving removal of surface deposits or catalyst poisons and a general removal and cleansing of catalyst surfaces. On the other hand, it is a phenomenon which usually persists in spite of the foregoing treatments. In any event, it results in the ultimate necessity for discarding the catalyst and replacing it with a fresh fill at such time as the yield of desired products has been reduced to an uneconomical level.

In accordance with the present invention, it has been discovered that the loss or decrease of catalyst activity after long periods of use at high temperature may be overcome, at least in part, by adding alkali metal to the catalyst.

The applicants believe that the unexpected improvement in catalyst activity and synthesis product distribution may be explained as follows, the explanation being offered to facilitate understanding of the invention. Of course, in advancing their theoretical explanation, the applicants do not wish to be restricted thereto since their invention is operative regardless of any theory. It appears that for each catalyst, depending upon its composition, method of preparation, physical form, conditions under which it is utilized, etc., there is required an optimum content of alkali metal if an optimum yield of liquid hydrocarbons is to be realized. A catalyst containing alkali metal, however, is observed in the course of an extended synthesis operation to lose activity or, perhaps more properly stated, selectivity in producing liquid hydrocarbons. This progressive tendency of the catalyst to produce less liquid and more gaseous hydrocarbons as the catalyst becomes older is attributed to the gradual loss of alkali metal from the catalyst metal. At the elevated, synthesis reaction temperatures, particularly in the range of about 550° to 700° F., the alkali metal appears to migrate from the catalyst surface, partly by volatilization in the flow of reactants but, apparently, in greater measure by migration from the catalyst metal to the carbonaceous matter which inevitably is deposited on the surface of the catalyst during the synthesis reaction. The rate of migration of alkali metal will vary with each catalyst according to the reaction temperature, the propensity of the catalyst to become coated with carbonaceous matter, catalyst composition, etc. The applicants note that as between two synthesis operations wherein the catalyst of one develops a greater carbonaceous deposit than does the catalyst of the other, the catalyst with greater carbonaceous deposit will generally require greater and/or more frequent additions of alkali metal to maintain a desired product distribution during an extended synthesis operation.

The invention, therefore, particularly concerns the use of iron catalysts operating at relatively high reaction temperatures. In the case of other typical synthesis catalysts, such as nickel and cobalt, operative at lower temperatures, the difficulty is less prevalent. However, the invention in its broadest aspect covers the use of all such catalysts in the present process.

It is accordingly an object of the present invention to prolong effective catalyst life and to maintain an even product distribution over long periods of operation, particularly with good yields of liquid hydrocarbons of relatively unsaturated character.

Another object of the present invention contemplates a process as above, carried on for extended periods without material modification of temperatures or pressures; in short, the maintenance of catalytic activity without altering temperature, pressures or other conditions is achieved in such a manner as to avoid any substantial shift in the desired product distribution.

The invention contemplates commencing the reaction with a catalyst of predetermined alkali metal content, and the addition of alkali, either continuously or periodically, as any undesirable shift in product distribution becomes apparent, in an amount sufficient to substantially re-establish the optimum product distribution.

Typical iron catalysts, as is known, may be prepared by subjecting an iron powder to a period of conditioning by passage of a synthesis gas comprising carbon monoxide and hydrogen until a condition of settled operation has been reached. Usually the aforementioned alkali metal compound, with or without one or more activators or promoters such as the oxides of thorium, magnesium, uranium, manganese, vanadium and the oxides or other compounds of the alkaline earth metals, are incorporated in any suitable way, as by intermixing a suitable aqueous solution followed by drying. Alternatively, catalysts may be prepared by precipitating suitable salts of the foregoing metals, drying, reducing in a stream of hydrogen and then conditioning as before. Precipitation may be carried out by treating the foregoing mixture of metal salts in the form of nitrates, acetates or formates and the like with an alkali metal carbonate. As is also known, the catalyst may be precipitated upon a support or carrier, such as diatomaceous earth, silica gel and various clays, and may be subsequently used in the form of a powder or as particles or pellets.

In the typical operation, in addition to other promoters, the catalyst will include up to, for example, 3 and in cases as high as 5 percent alkali metal, calculated as the oxide and based on the weight of active catalytic metal present. Under the conditions of temperature, pressure, space velocity, charge, etc., optimum for the production of liquid hydrocarbons, the reaction proceeds in a typical manner. Addition of alkali metal compound, to compensate for objectionable decrease in yield of liquid hydrocarbons, may be carried out in any practical manner. Thus, for example, a series of injectors suitably spaced throughout the catalyst bed may spray and distribute a solution of alkali metal compound uniformly upon the surfaces of the catalyst, the solution being of suitable concentration and quantity to result in the desired specific addition. Alternatively, the catalyst may be thoroughly and uniformly wetted with an appropriate aqueous solution of alkali metal compound passed through it until the amount absorbed corresponds to the selected addition of alkali metal.

While the process may be terminated and the catalyst removed from the reaction zone prior to impregnation and drying, the present invention lends itself in many cases to catalyst impregnation in the reaction zone and without any substantial prior cooling of the catalyst. In short, uniform distribution of the solution upon the catalyst may result in prompt drying by virtue of the heat stored up in the catalyst, together with such heat energy as may be generated by concurrent passage of the hydrogen and carbon monoxide reactants.

This effect is particularly advantageous in the case of catalytic hydrocarbon syntheisis processes operated with the catalyst in a condition of dense phase fluidization wherein, as is known, the catalyst particles are buoyed up or suspended in an upflow of reactant gases for random vibratory and relatively turbulent motion. Under such conditions, a spray of a suitable alkali metal compound solution into the reaction zone along with the feeding gases, mixes and is absorbed promptly and uniformly upon the catalyst particles and appears immediately to dry. This may be accomplished without agglomeration of the catalyst if addition is carefully and slowly made.

The alkali metal compound to be employed is preferably alkaline in reaction and if it is a salt contains an acid radical which is innocuous or substantially inert with respect to the activity of the catalyst. As examples of the types of compounds that are included within the scope of the invention there may be mentioned the alkali metal carbonates, bicarbonates, hydroxides, formates, acetates, citrates, and the like. Alkali soaps such as the sodium and potassium soaps of the palmitic, oleic and other fatty acids are useful. Fluorides of the alkali metals, particularly potassium fluoride, are of particular advantage in cases where liquid products of high anti-detonation value are desired. Of the alkali metals, potassium is particularly preferred in accordance with the present invention. The others, however, such as sodium, lithium and rubidium, possess some advantage and are definitely contemplated within the broad scope thereof. Since the carbonates are readily available and produce excellent results, these are to be preferred.

Inasmuch as potassium carbonate is particularly satisfactory, further description will be given of operations utilizing this compound. The addition of potassium carbonate to be made will be indicated by analysis of the synthesis reaction product to detect any undesired shift in product distribution and the addition of alkali metal to the catalyst will be continued until the undesired shift has been overcome partly or completely, as desired.

Replacement or addition may be carried out either continuously or periodically, as desired. In accordance with the continuous procedure, a very minor spray of a nonaqueous solution of an alkali metal compound may be injected into the feed gases at a rate appropriate to the rate at which alkali metal is lost from the catalyst during operation. On the other hand, with a well operated system wherein the alkali metal loss falls in the rate range of about 0.01 to 1.0%, calculated as alkali metal oxide and based on the catalyst material, per thousand hours, it may be more convenient to make the addition periodically after a definite loss of catalytic activity has been observed.

In order that the invention may be understood more fully, reference will be had to the following example:

An iron catalyst is provided, comprising iron finer than 200 mesh, about 35% passing a 325 screen. The catalyst includes about 1.5% potassium oxide and about 1% alumina, and is subjected to a period of conditioning until settled operation results. Reaction is carried out in a typical fluidized reactor under a pressure of 250 pounds per square inch gauge with a feed consisting of a mixture of hydrogen and carbon monoxide in the molar ratio of 2:1, passed upwardly therethrough at a linear velocity of about 1.2 feet per second. The fluidized catalyst bed is about 20 feet deep. A reaction temperature of 645° F. is maintained constant throughout the reaction mass by means of suitable cooling surfaces immersed within the fluidized mass of catalyst. Under these conditions, of the carbon monoxide converted, 5% goes to carbon dioxide, 10% to $C_1$ and $C_2$ hydrocarbons and 85% to $C_3$ and higher hydrocarbons. Without any treatment, the hydrocarbons boiling in the gasoline range by themselves correspond to 50% of the consumed carbon monoxide. By treating the reaction products, for instance, deoxygenating the oxygenated hydrocarbons and polymerizing the unsaturated $C_3$ and $C_4$ hydrocarbons, the gasoline fraction will then correspond to about 75% of the consumed carbon monoxide.

After operating for about 250 hours, the activity of the catalyst is reduced to the point where the reaction product distribution, based on the disappearance of carbon monoxide, is 5% carbon dioxide, 20% $C_1$ and $C_2$ hydrocarbons and 75% $C_3$ and higher hydrocarbons.

An attempt to reduce the production of $C_1$ and $C_2$ hydrocarbons by lowering the reaction temperature to 620° F. results in a product distribution of 20% carbon dioxide, 12% $C_1$ and $C_2$ hydrocarbons and 68% $C_3$ and higher hydrocarbons. While the reduction of $C_1$ and $C_2$ hydrocarbons is achieved there is, however, no improvement in the yield of higher hydrocarbons.

On the other hand, when a quantity of potassium carbonate, equivalent to 0.3% of potassium oxide ($K_2O$) based on the weight of catalytic iron, is added uniformly to the catalyst by spraying the catalyst with a 3% aqueous solution of potassium carbonate, and the catalyst is dried and brought back to a reaction temperature of 645° F., the product distribution is substantially that noted during the first 250 hours of operation. During the next 200 to 250 hours of operation, the product distribution is observed to shift in the direction of decreased yield of $C_3$ and higher hydrocarbons and, as before, an addition of potassium carbonate is made to the catalyst to compensate for this shift.

The addition of potassium carbonate is repeated periodically in the course of operation and in this way the catalyst after about 1500 hours of use yields substantially the same products noted in the initial operation period of 250 hours.

It will be understood that the foregoing example is merely illustrative of one specific embodiment of the invention and that various types of operation as well as proportions of alkali metal, for example, may be employed. Thus, for instance, the invention is not limited to fixed bed or fluidized operations discussed above, but can be employed in conjunction with other conventional methods of catalyst contact including the use of foam catalysts and those suspended in liquids such as proper oil. It will be further understood from the foregoing that where catalytic metals other than iron are employed, temperatures, pressures, etc., will be those normally characteristic of the catalyst in question. Moreover, as previously indicated, the alkali metal concentration may be maintained at any preselected level of concentration within the usual operative range. As is true with any catalyst for this reaction, optimum reaction temperatures should be determined in advance by making tests of representative samples at various temperatures. Pressures will fall within the range from atmospheric upwardly; in the case of iron catalyst, generally about 10 to 30 atmospheres.

The method may be varied within wide limits in respect to the proportions of carbon monoxide and hydrogen, pressure, space velocity, etc., since the effect of replacing the alkali metal compound is apparently largely independent of these variables. The invention, moreover, contemplates replacement of alkali metal content by alkali metal compounds differing from those previously employed in making the catalyst. In general, this is immaterial insofar as the alkali metal added corresponds to, or is a substantial portion of, that lost during operation.

It is to be understood that the initial alkali metal content of the catalyst will depend upon the specific catalyst, the reaction conditions, and the hydrocarbon products desired. The term hydrocarbons as used herein refers to oxygenated hydrocarbons, as well as hydrocarbons free from oxygen, either or both of which may, as is known, be selectively produced in accordance with the foregoing process by maintenance of the appropriate conventional reaction conditions. The invention, as is obvious from the foregoing, is particularly advantageous in the synthesis of hydrocarbons boiling in the motor gasoline range, but is also beneficial when producing lighter or heavier hydrocarbons.

The invention does not exclude the recycling of product gases or addition of other gases to the fresh feed reactants with the corresponding advantages known in the art. Obviously, many modifications and variations of the invention may be made without departing from the spirit and scope thereof and therefore only such limitations should be imposed as are indicated in the appended claims.

We claim:

1. In a vapor phase process for the reaction of carbon monoxide and hydrogen to produce compounds of higher molecular weight than carbon monoxide including normally liquid hydrocarbons wherein the reaction is carried out in the presence of a catalyst of the iron group having a relatively minor alkali metal content as a promoter and under conditions of dense phase fluidization of the catalyst and wherein the selectivity of the catalyst for the production of normally liquid hydrocarbons tends to decline during the life of the catalyst, the improvement which comprises periodically supplementing the alkali metal content of the catalyst during the life of the catalyst by injecting an alkali metal compound effective for improvement of said selectivity directly onto said fluidized catalyst and thereby restoring said selectivity of the catalyst.

2. In a vapor phase process for the reaction of carbon monoxide and hydrogen to produce compounds of higher molecular weight than carbon monoxide including normally liquid hydrocarbons wherein the reaction is carried out in the presence of a catalyst of the iron group having a relatively minor alkali metal content as a promoter and wherein the selectivity of the catalyst for the production of normally liquid hydrocarbons tends to decrease with use, the improvement which comprises introducing a solution of a compound of said alkali metal effective for improvement of said selectivity into contact with the catalyst in the reaction zone in an amount sufficient to substantially maintain said selectivity of the catalyst and under conditions effecting deposition of the alkali metal content of the solution on the catalyst.

3. A process as defined in claim 2 wherein the solution of alkali metal compound is sprayed directly on the catalyst in the reaction zone.

4. A process as defined in claim 3 wherein the alkali metal compound is potassium carbonate.

5. A process as defined in claim 4 wherein the potassium carbonate is added with the feed gas.

6. In a vapor phase process for reacting carbon monoxide and hydrogen for the production of hydrocarbons and oxygenated hydrocarbons by contact with a synthesis catalyst of the iron group promoted with a small amount of an alkali metal compound to produce a reaction product of desired composition and wherein the gaseous reactants are continuously passed in contact with the catalyst in solid particle form in a reaction zone maintained at a predetermined level of reaction temperature in the range up to about 700° F. and the normally liquid constituents of said product continuously pass from the reaction zone in vapor phase during an extended on-stream period of operation, the improvement which comprises adding controlled amounts of said promoter to the catalyst during said period of operation to maintain the selectivity of the catalyst for the production of said product of desired composition and continuing said operation at substantially the same reaction temperature level.

7. A process as defined in claim 6 wherein the alkali metal compound is potassium carbonate.

8. A process as defined in claim 6 wherein a solution of alkali metal compound is sprayed directly on the catalyst.

9. A process as defined in claim 6 wherein the alkali metal compound is added with the feed gas.

PERCIVAL C. KEITH.
EARL W. RIBLETT.

REFERENCES CITED

The following references are of record in the file of this patent:

UNITED STATES PATENTS

| Number | Name | Date |
|---|---|---|
| 1,801,382 | Wietzel | Apr. 21, 1931 |
| 2,395,875 | Kearby | Mar. 5, 1946 |
| 2,408,139 | Gutzeit | Sept. 24, 1946 |
| 2,464,480 | Beck et al. | Mar. 15, 1949 |

OTHER REFERENCES

U. S. Naval Technical Mission in Europe, Synthesis of Hydrocarbons and Chemicals from CO and $H_2$, September 1945.